F. W. SMITH.
ANTISLIP DEVICE FOR VEHICLE WHEELS.
APPLICATION FILED JUNE 22, 1920.
1,374,328.
Patented Apr. 12, 1921.
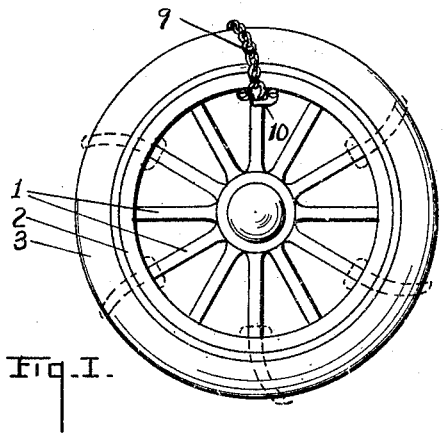
Fig. I.
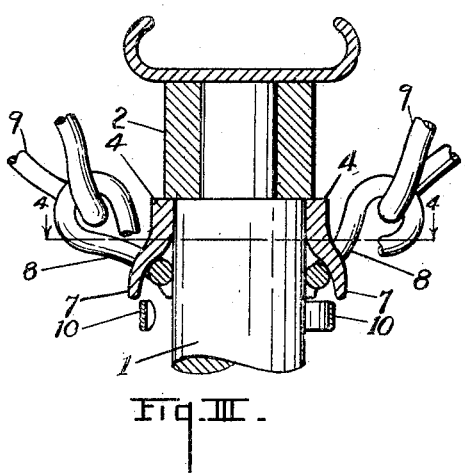
Fig. III.
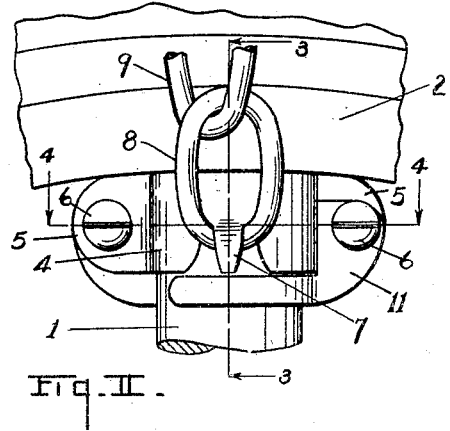
Fig. II.
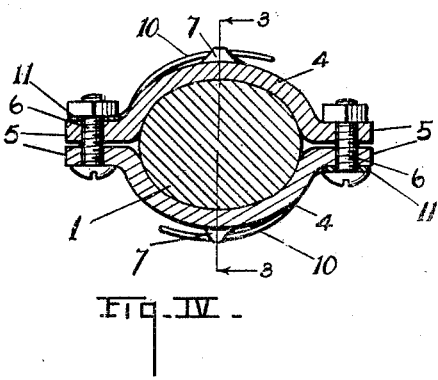
Fig. IV.
Inventor
Frank W. Smith
By Chappell & Earl
Attorneys
Witnesses

UNITED STATES PATENT OFFICE.

FRANK W. SMITH, OF KALAMAZOO, MICHIGAN.

ANTISLIP DEVICE FOR VEHICLE-WHEELS.

1,374,328.  Specification of Letters Patent.  Patented Apr. 12, 1921.

Application filed June 22, 1920. Serial No. 390,744.

*To all whom it may concern:*

Be it known that I, FRANK W. SMITH, a citizen of the United States, residing at Kalamazoo, county of Kalamazoo, State of Michigan, have invented certain new and useful Improvements in Antislip Devices for Vehicle-Wheels, of which the following is a specification.

This invention relates to improvements in anti-slip devices for vehicle wheels.

The main objects of this invention are to provide an improved anti-slipping attachment for vehicle wheels which may be applied to the wheels of a vehicle and the tread members quickly engaged and disengaged therefrom.

A further object is to provide an improved anti-slipping attachment for vehicle wheels which is simple and economical in structure and neat in appearance.

Further objects, and objects relating to structural details, will definitely appear from the detailed description to follow.

I accomplish the objects of my invention by the devices and means described in the following specification. The invention is clearly defined and pointed out in the claims.

A structure which is a preferred embodiment of my invention is clearly illustrated in the accompanying drawing forming a part of this specification, in which:

Figure I is a side elevation of a vehicle wheel with one of my anti-slip devices shown in full lines, others being indicated by dotted lines.

Fig. II is an enlarged detail side elevation of a vehicle wheel embodying the features of my invention.

Fig. III is a detail view partially in section on a line corresponding to line 3—3 of Figs. II and IV.

Fig. IV is a detail section on a line corresponding to line 4—4 of Figs. II and III.

In the drawing, similar reference characters refer to similar parts throughout the several views, and the sectional views are taken looking in the direction of the little arrows at the ends of the section lines.

Referring to the drawing, 1 represents the spokes of a vehicle wheel, 2 the rim and 3 the tire. My improved anti-slipping device comprises a pair of complementary spoke clamping members 4 having opposed ears 5, the members being clamped upon the spokes by the bolts 6 disposed through the ears. The ears are disposed longitudinally of the rim.

Each clamping member is provided with a laterally offset hook 7 adapted to receive the end links 8 of a tread chain or member 9. To prevent the disengagement of the links 8, I provide the hooks with blade spring guards 10 which normally lie across the points of the hooks, but may be deflected to permit the engagement and disengagement of the links. These springs 10 are curved to correspond generally with the curvature of the clamping members and are provided with plate-like base portions 11 which lie against the ears and are clamped in position by the bolts 6.

With this arrangement of parts, the clamping members may be quickly applied to or removed from the spokes, but it is intended that they shall be left on the spokes where there is a frequent occasion for using the anti-slip device, the tread chains being easily attached or removed as conditions render expedient.

Having thus described my invention, what I claim as new and desire to secure by Letters Patent is:

1. In an anti-slipping attachment for vehicle wheels, the combination of a pair of complementary spoke clamping members adapted to seat against the rim of a wheel and having opposed ears disposed longitudinally of the rim, each member having a central laterally offset hook adapted to receive a tread member, clamping bolts disposed through said clamping member ears, and curved blade spring guards having plate-like base portions disposed against the sides of the clamping member ears and engaged by said bolts, so that the springs lie normally across the points of the hooks.

2. In an anti-slipping attachment for vehicle wheels the combination of a pair of spoke clamping members having opposed ears disposed longitudinally of the rim, each member having a central laterally offset hook adapted to receive a link of a tread member, clamping bolts disposed through said clamping member ears, and blade spring guards for said hooks supported by said bolts.

In witness whereof, I have hereunto set my hand and seal in the presence of two witnesses.

FRANK W. SMITH. [L. S.]

Witnesses:
 LUELLA G. GREENFIELD,
 MARGARET L. GLASGOW.